Oct. 20, 1936.  F. S. MILBURN  2,057,785
APPARATUS FOR FERTILIZING
Filed June 13, 1935  2 Sheets-Sheet 2

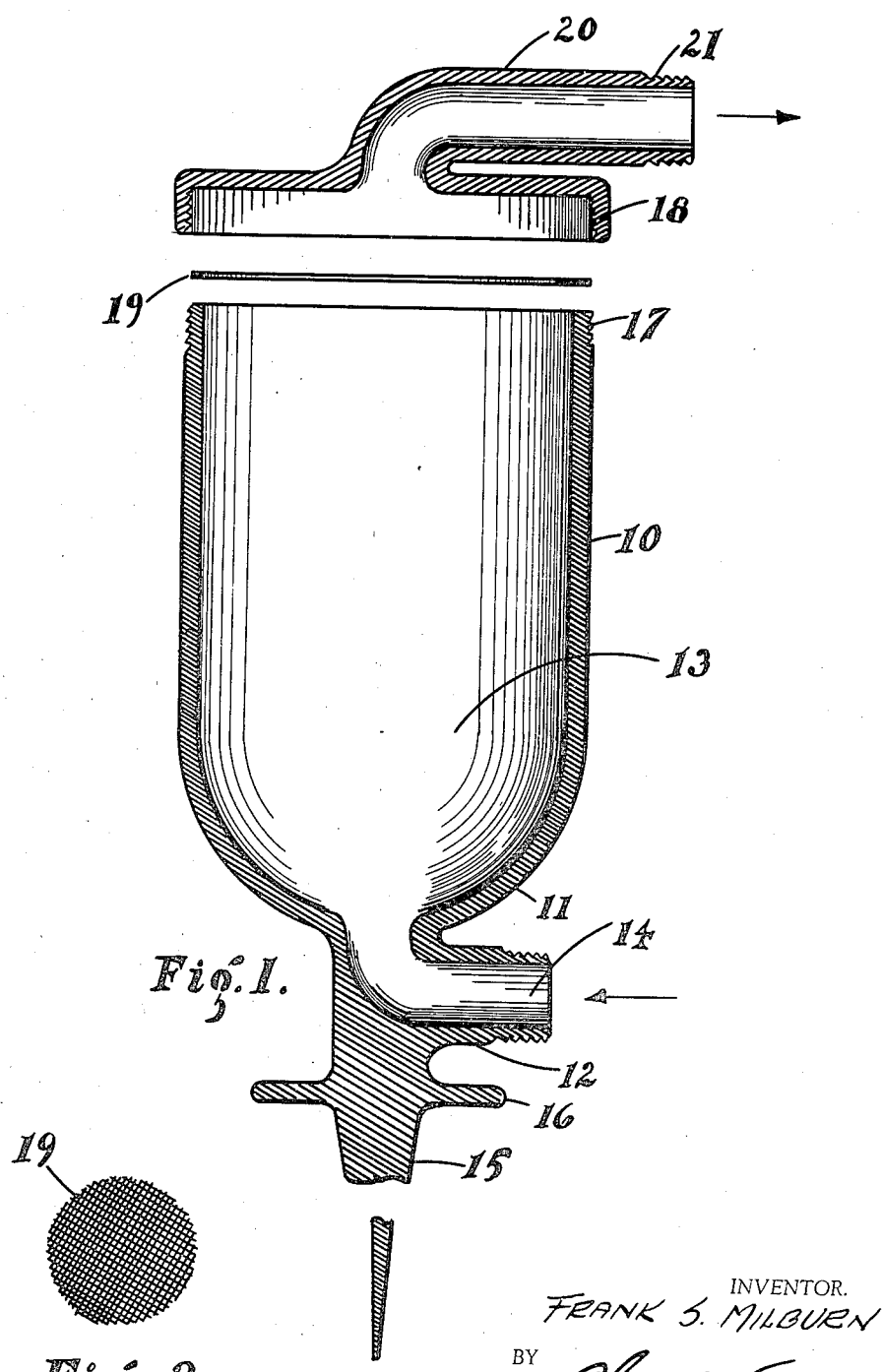

INVENTOR.
FRANK S. MILBURN
BY Chester Tietz
ATTORNEY.

Patented Oct. 20, 1936

2,057,785

UNITED STATES PATENT OFFICE 2,057,785

APPARATUS FOR FERTILIZING

Frank S. Milburn, Covington, Ky.

Application June 13, 1935, Serial No. 26,463

3 Claims. (Cl. 299—83)

This invention relates to an apparatus for fertilizing lawns, flower beds and the like.

The objects of the invention are to provide a method and means for fertilizing of this character without "burning" and with maximum ease of distribution and cleanliness of handling.

Briefly described, the method comprises directing a stream of water thru a space containing a freely soluble fertilizer such as ammonium sulfate or sodium nitrate, then thru a screen fine enough to restrain crystalline solid particles, then thru a sprinkler until all of the fertilizer in the chamber is dissolved, then continuing the spraying at substantially the same rate for at least fifteen minutes after the last of the fertilizer is dissolved, without altering the position of the sprinkling apparatus. In this way sufficient pure water is insured after fertilization to prevent crystallization on the leaves and consequent "burning."

The apparatus about to be described is the most expeditious for carrying out this method that, I believe, has yet been invented.

Referring to the accompanying drawings, Fig. 1 is a longitudinal section thru the middle of the fertilizer reservoir.

Fig. 2 is a plan detail of a screen, the side view of which is shown in Fig. 1 immediately below the reservoir lid.

Figure 3:
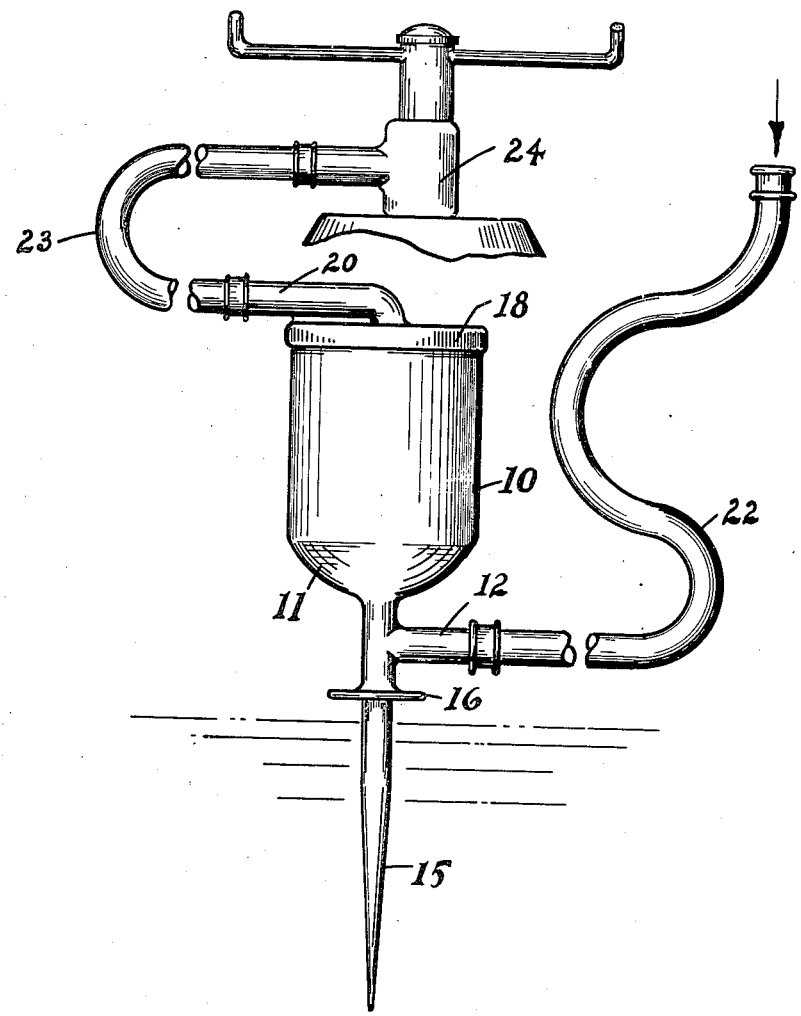
Fig. 3 is a side elevation of the combination which I use to carry out my method. Here the reservoir is shown as being fixed in the ground by a spike while a rotary sprinkler is shown above the reservoir.

In the drawings 10 is a reservoir having a hemispherical or conical bottom 11. Extending toward the side from the bottom is a pipe 12, threaded on its end for a hose connection and being in free communication with the interior 13 of the reservoir. The opening 14 in the pipe makes a bend so as to approach the space 13 vertically. The pipe 12 is preferably integral with the reservoir body 10, as is a spike 15 below the pipe, and coincidental with the vertical axis of the reservoir. The spike offers a convenient means of anchoring the reservoir in the ground while a circular boss 16 is provided at the top of the spike to assure stability of the reservoir while it is anchored and to preserve clearance between the surface of the ground and the water inlet.

The upper end of body 10 is provided with a thread 17 and a lid 18 internally threaded to engage thread 17. A disc 19 of wire screen, also shown in Fig. 2 is provided to fit over the top edges of body 10 and be held in place by the lid 18.

From the top center of the lid 18 an elbowed pipe 20 extends outwardly beyond the lines of body 10. At its end it is provided with a thread 21 to receive a hose coupling.

In Fig. 3 the reservoir is shown pushed into the ground to an erect position. An ordinary garden hose 22 supplies fresh water to inlet pipe 12 thru which it streams upward thru the body 10 which has been previously filled with fertilizer. Solution of the latter occurs which solution leaves pipe 20 and another hose connection 23 to a sprinkler 24 preferably of the rotary type.

The latter distributes the solution by centrifugal force and thereafter, without any attention on the operator's part, pure water follows and falls upon substantially the same area sprinkled with fertilizer. The latter is then washed off the leaves and carried into the ground where it belongs. If the water pressure is low, naturally a longer period of sprinkling with pure water is needed to complete the washing operation, but any person of good judgment can estimate the necessary compensation correctly.

An advantage due to the hemispherical or conical bottom 11 is that channeling of the water thru the fertilizer with failure to dissolve or suspend all of it in water is avoided. In my construction whatever solid matter remains undissolved will slide down to the lowest or inlet point on the bottom and there engage the water stream. Even difficultly soluble fertilizers like those of the urea types can therefore be handled since their continued contact with the water stream is assured.

The apparatus is made preferably of metal although other materials may be used.

I claim as my invention:—

1. In combination, a container, a sloping floor therein, means for admitting a stream of water from a garden hose to said container from the bottom thereof, spike means on the bottom of said container for supporting the container upright, said means being adapted to penetrate the ground, a lid for said container, means for water to flow out of said lid thru the center thereof, means to attach a garden hose to the said outlet and means on said spike means to preserve clearance between said water inlet and the surface of the ground and also to assist in holding the container upright.

2. In combination, a metal container, a bottom therefor sloping interiorly toward the center thereof, said bottom having an inlet to the interior of the container at the center of said bottom, means for attaching a hose to said inlet, a spike integral with the container on the bottom thereof for supporting said container upright in the ground, a lid for said container having an outlet at its top, means for attaching a hose to said outlet, means for securely attaching said lid to said container and means between said lid and said container for restraining solid particles from leaving the container.

3. In combination, a metal container body having a floor which slopes toward a point approximately the center thereof and which has an opening at its lowest point, a threaded pipe in communication with the interior of the container thru said opening, said pipe projecting at right angles to the vertical axis of the container body, a spike below the container body and coincidental with the vertical axis thereof, a lid threadedly attached to the top of the container, a fine mesh disk screen between the lid and the container body and an angularly projecting pipe extending from the lid.

FRANK S. MILBURN.